Patented Sept. 7, 1937

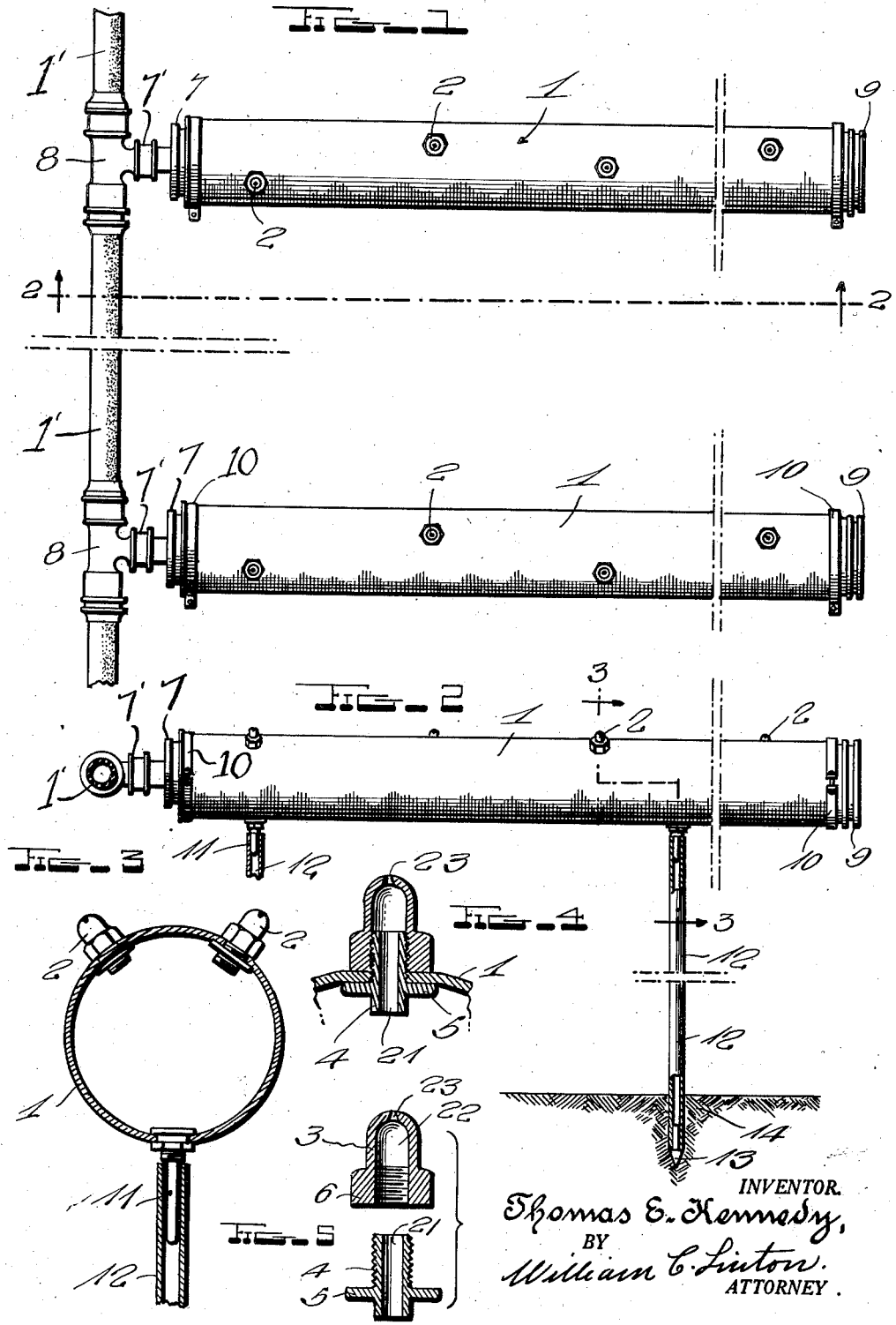

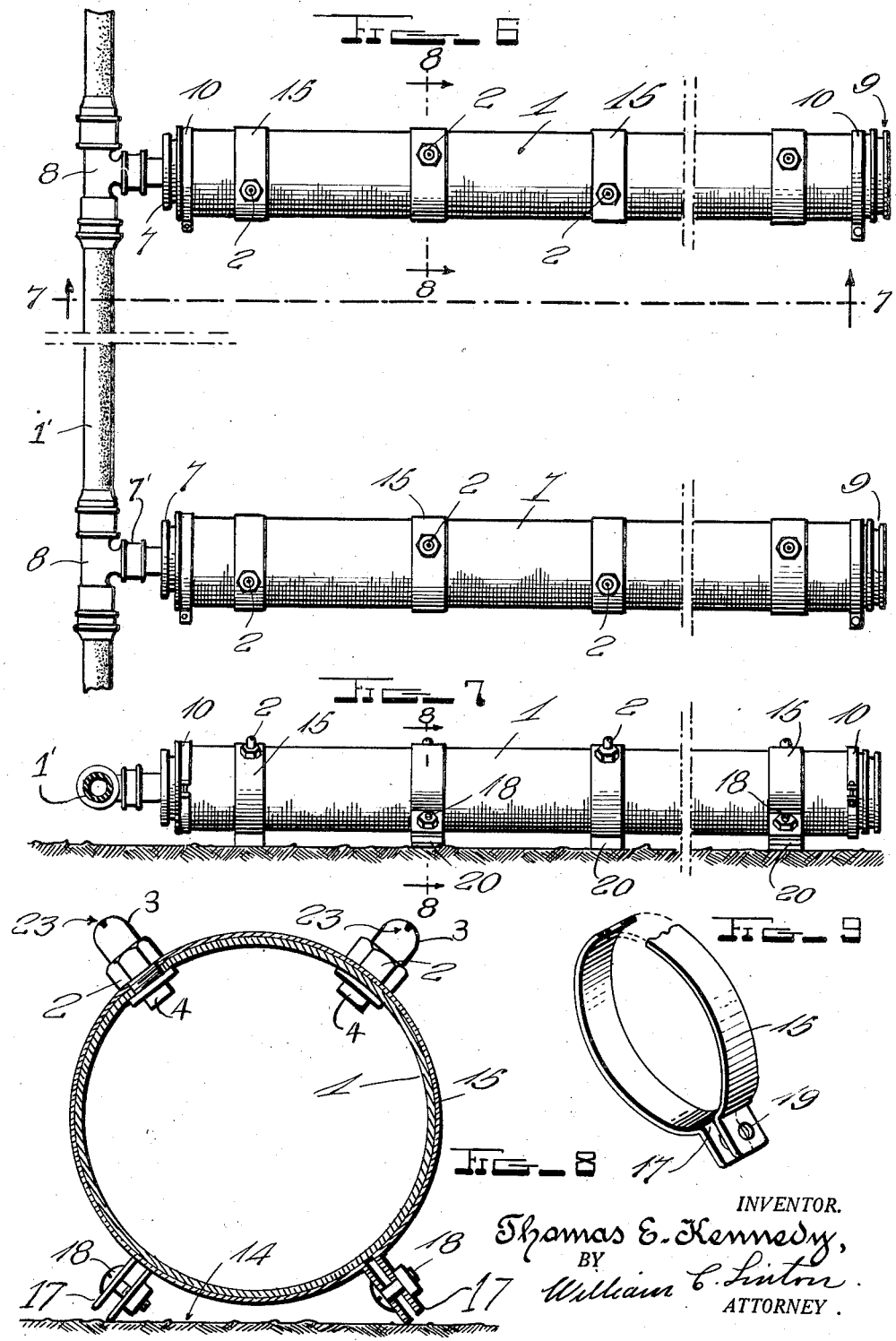

2,092,674

UNITED STATES PATENT OFFICE 2,092,674

IRRIGATING HOSE

Thomas E. Kennedy, New York, N. Y.

Application March 4, 1936, Serial No. 67,118

2 Claims. (Cl. 299—106)

The present invention relates to sprinklers, particularly such as are used for sprinkling or irrigating lawns, gardens, and the like.

An important object of the invention is to provide a sprinkler which is flexible, strong and at the same time light in weight so that it may be easily and readily handled and controlled by one person.

Another object of the invention is to provide nozzles which may be readily and easily mounted on or removed from the main body of the sprinkler, but when fastened thereto, provide a tight and leak proof connection.

A further object of the invention is to provide nozzles which are simple in construction but efficient for the purpose desired.

A still further object of the invention is to provide means that will reenforce the main body of the sprinkler and at the same time hold the body in a given position in relation to the surface thereunder.

A still further object is to provide detachable means for supporting the main body of the sprinkler above the surface thereunder.

Other objects of the invention will be in part obvious and in part pointed out hereinafter.

In order that the invention and its mode of operation may be readily understood by persons skilled in the art, I have in the accompanying illustrative drawings and in the detailed following description based thereon, set out several possible embodiments of the same.

In these drawings:

Fig. 1 is a top plan view of two sprinkler units and their mode of connection.

Fig. 2 is a side view of Fig. 1 with a sectional showing of the detachable supporting rod.

Fig. 3 is a cross sectional view taken on the line 3—3 of Fig. 2 in the direction of the arrow points.

Fig. 4 is a cross sectional view of one of the nozzles mounted on the main body of the sprinkler.

Fig. 5 is a cross sectional view of one of the nozzles showing each part separately.

Fig. 6 is a top plan view similar to Fig. 1 but showing a slightly modified form of the invention.

Fig. 7 is a side view of Fig. 6.

Fig. 8 is a cross sectional view taken on the line 8—8 of Fig. 6 in the direction of the arrow points, and Fig. 9 is a detailed perspective view of the utility band as used in the modified form of the invention.

Referring now more particularly to the accompanying drawings wherein like and corresponding parts are designated by similar reference characters throughout the several views, numeral 1 refers to the main body of one of the sprinklers which is preferably a cylindrical hose of canvas material. The canvas hose comprising body 1 is to be of a strong heavy duck canvas treated with a mildew proof and water proof treatment generally known as fire hose.

These sprinkers 1 are connected to the main water supply by means of the garden hose 1' and the connections between the sprinklers and the garden hose 1' consist of T-couplings 8 which are secured within the sections of the garden hose 1' in any conventional manner or as that shown in the drawings. Placed within one end of each sprinkler 1 is a plug 7 having a detachable connection 7' with the T-couplings 8 whereby the water supplied to the garden hose 1' may pass into the sprinklers 1. The plugs 7 are retained in place within the sprinkler 1 by means of the split couplings 10. The opposite ends of the sprinklers are closed by means of plugs 9 and these plugs are retained within these opened ends of the canvas hose 1 by means of the split couplings 10. Arranged within each sprinkler 1 in spaced and staggered relation with each other and a plurality of nozzles 2. From the foregoing, it will be obvious that as water is supplied to the main supply pipe or garden hose 1' the same will enter the sprinklers 1, which latter are of greater diameter than that of the supply pipe 1' and this water will flow in a spray from the nozzles 2 over the lawn to be irrigated. The sprinklers 1 being made of a canvas hose will obviously be light in weight, whereby they may be easily and readily moved at desired points over a lawn to be sprinkled or irrigated.

The nozzles 2 are arranged within the sprinklers 1 adjacent the upper face thereof and extend at an angle as is better illustrated in Figure 3 of the drawings, so that the water being discharged from these nozzles will be sprayed in an upwardly and outwardly direction from the sprinklers 1.

Each nozzle is formed from an outer section 3 and an inner section 4. The inner sections 4 are provided with an annular flange 5 and an externally threaded cylindrical portion which extends through openings formed within the canvas hose 1. The outer sections 3 of each nozzle have formed therewith a hexagonally shaped nut 6 which is internally threaded and adapted to engage over the threaded portion of the section 4 whereby the flange 5 of the section 4 will press against the inner face of the canvas hose 1 in the manner as disclosed in Figure 4 of the drawings and when the upper section 3 is applied to the lower section, that portion of the canvas hose 1 about the openings formed therein will act as a washer between the sections of the nozzle so as to prevent leakage thereabout.

The various sprinklers 1 may be laid directly upon the lawn or ground which is to be sprinkled or irrigated or they may be elevated to the desired height above the ground wherein this system of sprinkling is employed for watering flowers, shrubbery or the like. In order to retain the sprinklers in this elevated position above the ground, I provide the supports 12. These supports 12 are preferably of a hollow construction having a pointed block 13 secured in one end thereof, which pointed block of the supports is to enter the ground, whereby the support may extend in a vertical position above the same. Connected to the lower face of the sprinklers 1 in the manner as better shown in Figure 3 of the drawings are pins 11, which latter are to be inserted within the upper open ends of the tubular supports 12. From this construction, it is quite obvious that the pins 11 may be employed for anchoring the sprinklers 1 at desired points upon the lawn or they may be detachably placed within the tubular supports 12 when the sprinklers are to be supported in elevated position above the lawns.

In the modified form of the invention, I have disclosed in Figures 6 to 9 inclusive of the drawings, another way in which the nozzles may be attached to the flexible sprinklers 1. The sprinklers 1 are provided with openings in the walls thereof through which the lower sections 4 of each nozzle may extend and the outer threaded portions of these nozzles extend through openings formed in the split rings 15. The outer sections 3 of the nozzles are then fastened to the threaded projecting ends of the inner sections 4 whereby the nozzles are retained in proper position and that portion of the canvas hose 1 adjacent the nozzles 2 will be reenforced. The opposite ends of the split bands 15 are provided with flanged projections 17 having aligning openings therein through which extend the bolts 18 whereby the split rings 15 may be detachably secured about the sprinklers 1. When these sprinklers are laid upon the lawn in the manner as illustrated in Figures 7 and 9, the flange projections 17 act as anchors for properly retaining the sprinklers in their placed positions upon the lawns.

The inner sections 4 of the nozzles are provided with channelways 21 which communicate with the dome-shaped inner compartment 22 of the outer sections 3 and the outer ends of the sections 3 are provided with openings 23 from which the water in spray form may be discharged.

From the foregoing, it is obvious that I have provided a sprinkling system for lawns, flowers, shrubbery and the like which may be cheaply manufactured, in that the parts are conventional, and when assembled, they will form a light portable sprinkler that may be easily and readily moved from place to place about a lawn and when so placed upon the lawn, will be anchored in proper position thereupon.

Manifestly, the construction herein shown is capable of considerable modification and such modifications as come within the scope of my claims, I consider within the spirit of my invention.

I claim:

1. A sprinkler unit comprising a tubular flexible main supply hose, a plurality of tubular collapsible hose sections each of greater diameter than said main supply hose, a T-coupling connecting one end of each of said hose sections to said main supply hose, the other end of each of said hose sections being closed, each of said sections having a plurality of longitudinally spaced openings formed in the surface thereof, a plurality of apertured annular bands embracing each hose section, each band having a plurality of pairs of oppositely disposed flanges arranged on the under side of its hose section, an aperture of a band and an opening in a hose section being in alignment, a nozzle extending through each aligned opening and aperture, said nozzle serving to clamp each band to its respective hose section, and the oppositely disposed pairs of flanges adapted to support the sections above a surface upon which the sprinkler unit may be positioned.

2. A sprinkler unit comprising a tubular flexible main supply hose, a plurality of tubular collapsible hose sections each of greater diameter than said main supply hose, a T-coupling connecting one end of each of said hose sections to said main supply hose, the other end of each of said hose sections being closed, each of said sections having a plurality of longitudinally spaced openings formed in the surface thereof, a nozzle for each opening, each nozzle comprising an outer section internally threaded and an inner section, the outer section including an apertured cap portion having an hexagonally shaped nut, the inner section having an annular flange and an externally threaded portion, said externally threaded portion extending through the opening and receiving the internally threaded outer section to clamp the hose section between the flange and nut, and means for supporting the sections above a surface upon which the sprinkler may be positioned.

THOMAS E. KENNEDY.